United States Patent Office 3,649,499
Patented Mar. 14, 1972

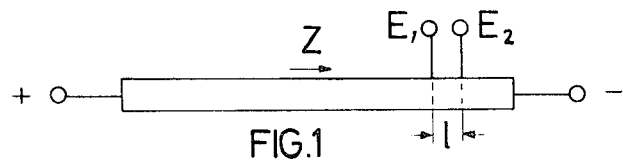
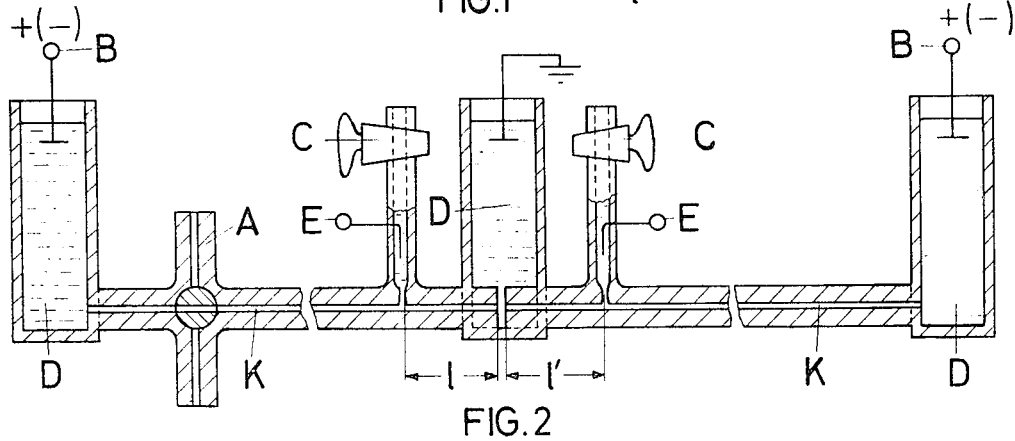
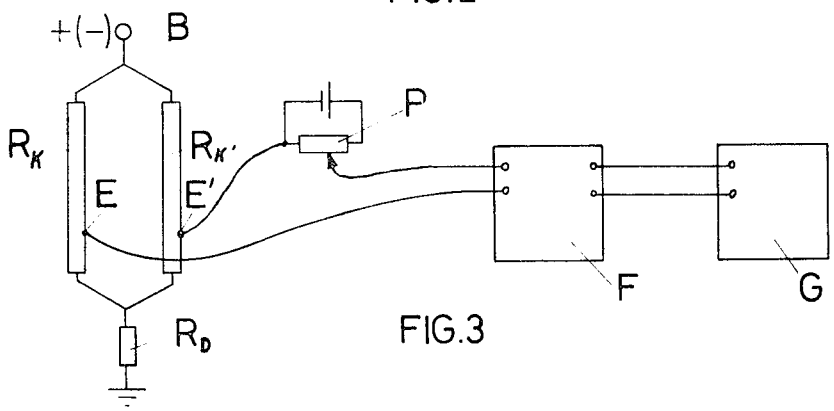
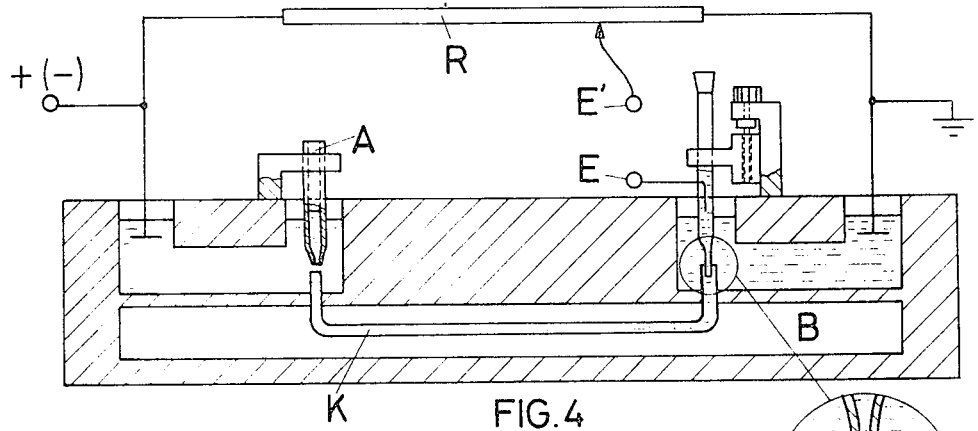
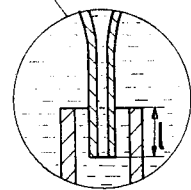

3,649,499
METHOD FOR ESTABLISHING THE ZONES OCCURRING IN ELECTROPHORESIS AND FOR THEIR QUANTITATIVE DETERMINATION
Rauno Erkki Virtanen, Otakallio 3 B 22, Otaniemi, Finland, and Pekka Kivalo, Kuusiniementie 21 E, Helsinki 34, Finland
Filed Mar. 24, 1969, Ser. No. 809,659
Claims priority, application Finland, Mar. 27, 1968, 853/68
Int. Cl. B01k 5/00
U.S. Cl. 204—108
5 Claims

ABSTRACT OF THE DISCLOSURE

A method is provided for establishing zones occurring in electrophoresis and for quantitively determining substances present in them. The method is characterized by measuring in the electrophoresis system the electrochemical potential of an electrode placed at a given point between end electrodes or connected by a salt bridge, or by measuring the change of this potential as a function of time with respect to a reference electrode.

---

The present invention concerns a method for establishing the zones occurring in electrophoresis and for their quantative determination. More precisely, it concerns a method in which the changes ensuing by influence of the sample in the potential gradient produced by the electrophoresis current are employed to indicate the travelling velocity of the sample and also the quantity of the sample.

The use of electrophoresis in analytics is based on the different speed of different, electrically charged particles in a solution when placed in an electric field. Owing to this effect the different components of the sample under investigation are separated, whereupon they may be separately determined.

In qualitative analysis one has to express the site of the different component zones in the electrophoresis phase or their travelling velocity and in quantitative analysis, furthermore, the substance quantity present in each zone. The following are the most commonly applied methods.

(1) The electrophoresis is carried out in a vessel, through which light is passed, and with the aid of this light the refractive index of the liquid column at each point is measured. From the change of the refractive index the location of the zone and its substance quantity can be determined.

(2) The zones are photometrically measured. This measurement can be made point by point across the zones, or the paper or other phase is made to travel automatically past the measuring element, while the equipment records the absorbance at each point.

(3) The zones in a stabilized phase, such as paper, which have been visualized e.g. by staining, are cut out and the investigated substance present in them is extracted. The extracted sample may be subjected to any desired method of analysis.

(4) The sample is labelled with radionucleids. From the zones an autoradiograph may be made, or they may be measured by counter similarly as colored zones are measured with the densitometer.

(5) The electrical conductivity has been measured in the electrophoresis cell as a function of distance or time. In such instances always a separate conductivity measuring bridge has been used. Measuring electrodes have been placed in the electrophoresis cell, or the electrolyte has been passed through a conductivity cell after concluded electrophoresis.

The following among the drawbacks of these methods may be mentioned. In the first place their accuracy is not always adequate. Secondly, they may be cumbersome and time-consuming, and some of these measurements cannot be performed until after the electrophoresis, as an operation. This is particularly objectionable especially in connection with high-voltage electrophoresis, in which the separation itself may be carried out even within a few minutes.

The present invention is characterized in that one measures in the electrophoresis system the electrochemical potential of an electrode placed between the end electrodes at a given point, or connected to it by a salt bridge, or the change of this potential in comparison with some reference electrode, as a function of time.

By means of the present invention, the travelling rate of the zones and the substance quantities present in them can be indicated during the course of the electrophoresis itself. Indication takes place electrically with the aid of the electrophoresis current, and its basis consists of the changes in the potential gradient caused by the zones.

Let it be assumed that conditions in the electrophoresis system are constant so that no changes occur in it other than the movement of the zone. In that case the resistance of the electrophoresis phase at each point is constant, and the potential gradient caused by the electrophoresis current is also constant. However, the sample substance causes changes in the conductivity of the electrophoresis phase, with the result that at the zone there also occurs a cange in the potential gradient. It is thus obvious that by measuring at a given point the potential gradient as a function of time the passage of the zone past this point can be indicated. The magnitude of the change of the gradient, again, indicates the quantity of substance in the zone.

The general principle of the measurement is seen from FIG. 1. The potential is measured at two points $E_1$ and $E_2$ between the end electrodes. As will be described later, one of the points of measurement may be one of the end electrodes. The potential difference between them remains constant ($U_o$) until the zone Z arrives between the points of measurement, whereupon the potential difference assumes some other value (U). By compensating the constant voltage $U_o$, one may measure the change in potential difference $\Delta U = U_o$ alone, which thus is the change of the potential gradient on the length 1.

The invention will appear more clearly from the following description of some of its embodiments, with reference to the attached drawings. FIG. 2 presents, in section, a device according to the invention. As already stated, FIG. 1 is a diagram showing the general principle of the measurement. FIG. 3 shows the circuit diagram of the device, partly in the form of a block diagram. FIG. 4 shows another embodiment of a device according to the invention, and FIG. 5 shows a detail of this embodiment, on larger scale.

The invention was tried out in experiments with equipment according to the figures, in zonal electrophoresis. In the device according to FIG. 2, electrophoresis takes place in a glass capillary K of 0.45 mm. inner diameter and 7 mm. outer diameter. The electrophoresis capillary K' and the electrode vessels D are filled with base electrolyte. By operating the stopcocks C, the side pipes can be filled with electrolyte with the aid of subatmospheric pressure, in which side pipes there are electrodes E and E' manufactured e.g. of platinum wire. The sample can be transferred into the capillary by means of the four-way valve A. The electrodes B are connected to the positive or negative pole of a current source, depending as to whether one desires to analyse for cations or anions. The potential of electrodes E and E' with reference to the grounded electrode vessel is composed of the voltage drops in the capillaries across the distances 1 and 1'. The apparatus has been so designed that these voltages are nearly equal. The potentiometer resistance P can be used to compensate the difference which may exist, or to adjust the difference to desired magnitude. When conditions are constant, the potential value of the electrodes remains constant. Passage of the sample zone through the capillary section 1 into the grounded electrode vessel is now evident as a change of the potenial of electrode E, which at the same time is a change in the potential difference between electrodes E and E'. This change is measured with the aid of a potentiometer F drawing minimal current, to which moreover a recorder G has been connected. In the circuit diagram in FIG. 3, the resistances $R_k$ and $R_k'$ represent the resistances of capillaries K and K', respectively, and the resistance $R_D$ stands for the resistance of the grounded electrode vessel, which is very small in comparison with the resistance of the capillaries however. For the duration of measurements the device is placed in a thermostatically controlled water bath, with the capillaries submerged in the water.

A device operating according to the same principle but somewhat different in its design is shown by FIG. 4. Here, too, the electrophoresis is made to take place in the capillary K. The sample is introduced with a fine-tipped micro syringe, with the aid of the guiding capillary A, into the electrophoresis capillary. The electrode E has its place in a tube, the end of which has been drawn to a capillary. The capillary portion is pushed into the electrophoresis capillary to the amount of the distance 1 with the aid of an adjustment device, by means of which it can be moved in three planes perpendicular to each other. The electrode capillary is filled with the same electrolyte as the rest of the device. The potential difference between electrode E and ground is made up virtually in its entirety by the voltage in the capillary over the distance 1 (except the potential of the end electrode with reference to the solution, which can be rendered constant, however, by using a reversible electrode), for the reason that the cross-section area of the electrode vessel is very large compared to the cross section of the capillary. The compensating potential is derived from the adjustable resistor R. The electrophoresis capillary passes from one electrode vessel to the other through the space B, where the temperature can be maintained at a constant value.

It has been found in experiments that were performed that the magnitude of the measured change in potential, both with cations and with anions, is linearly proportional to the concentration of the sample solution. It has been found that reproducible differentation of different kinds of ions and measurement of their velocities is possible with the devices.

We claim:

1. A method in electrophoresis, when different electically charged particles becomes divided in the electric field existing between end electrodes into zones with different travelling velocities, for determining the travelling velocity and concentration of these zones for the purpose of quantitative analysis of the different substances in the different zones, said method comprising measuring with the aid of a measuring electrode the electrochemical potential in the electrophoresis system at a fixed point between the end electrodes and recording it with reference to the potential of a reference electrode while the zones under consideration travel past said fixed point, whereby the rate of change and magnitude of change of the potential difference thus recorded an the time needed for the change are used as a measure for the concentration and travelling velocity of the zone under consideration.

2. A method according to claim 1, wherein said reference electrode, with reference to which the potential is measured, is provided in the electrophoresis system constituting the object of measurement at a point different from that where the electrochemical potential is measured.

3. A method according to claim 1, wherein said reference electrode is provided in an electrophoresis system separate from that constituting the object of measurement, said second electrophoresis system having one end electrode in common with the electrophoresis system constituting the object of measurement.

4. A method according to claim 1, wherein the potential of said reference electrode is derived from the slide contact of a potentiometer connected across the end electrodes of the electrophoresis system constituting the object of measurement.

5. A method according to claim 1, wherein the measuring electrode is located at the end of a salt bridge, the other end of said salt bridge being connected to said fixed point in the electrophoresis system constituting the object of measurement the potential of which is measured.

References Cited

UNITED STATES PATENTS

| 3,320,148 | 5/1967 | Skeggs | 204—180 R |
| 3,432,414 | 3/1969 | Rand | 204—180 R |
| 3,454,487 | 7/1969 | Riddick | 204—180 R |
| 3,563,872 | 2/1971 | Hueburev | 204—180 R |

F. C. EDMUNDSON, Primary Examiner

U.S. Cl. X.R.

204—299